(12) United States Patent
Makino

(10) Patent No.: US 10,232,262 B2
(45) Date of Patent: Mar. 19, 2019

(54) INFORMATION PROCESSING APPARATUS, MOTION CONTROL METHOD, AND NON-TRANSITORY COMPUTER-READABLE RECORDING MEDIUM

(71) Applicant: KOEI TECMO GAMES CO., LTD., Kanagawa (JP)

(72) Inventor: Kosuke Makino, Kanagawa (JP)

(73) Assignee: KOEI TECMO GAMES CO., LTD., Kanagawa (JP)

(*) Notice: Subject to any disclaimer, the term of this patent is extended or adjusted under 35 U.S.C. 154(b) by 148 days.

(21) Appl. No.: 15/296,121

(22) Filed: Oct. 18, 2016

(65) Prior Publication Data

US 2017/0113138 A1    Apr. 27, 2017

(30) Foreign Application Priority Data

Oct. 27, 2015    (JP) .................................. 2015-210832

(51) Int. Cl.
| | | |
|---|---|---|
| *A63F 13/00* | (2014.01) | |
| *A63F 13/5258* | (2014.01) | |
| *H04N 5/232* | (2006.01) | |
| *G06T 19/20* | (2011.01) | |
| *A63F 13/20* | (2014.01) | |
| *A63F 13/25* | (2014.01) | |

(52) U.S. Cl.
CPC .......... *A63F 13/5258* (2014.09); *A63F 13/20* (2014.09); *A63F 13/25* (2014.09); *G06T 19/20* (2013.01); *H04N 5/23219* (2013.01); *G06T 2219/2016* (2013.01)

(58) Field of Classification Search
CPC ....................................................... A63F 13/00
USPC ......................................................... 345/633
See application file for complete search history.

(56) References Cited

U.S. PATENT DOCUMENTS

| | | | | |
|---|---|---|---|---|
| 6,283,857 | B1* | 9/2001 | Miyamoto | ............ A63F 13/06 463/31 |
| 7,094,153 | B2* | 8/2006 | Kunieda | ................ A63F 13/10 348/E5.028 |
| 2001/0049300 | A1 | 12/2001 | Okamoto et al. | |
| 2014/0354687 | A1* | 12/2014 | Kiuchi | ................ G06T 19/006 345/633 |

FOREIGN PATENT DOCUMENTS

JP    2001-276420    10/2001

* cited by examiner

*Primary Examiner* — Hai Tao Sun
(74) *Attorney, Agent, or Firm* — IPUSA, PLLC

(57) ABSTRACT

An information processing apparatus includes a virtual camera configured to capture a character in a virtual space; a display unit configured to display the character and a background, the background including an object; a detection unit configured to detect first contact position information on a first position at which a first virtual object provided between the virtual camera and the character contacts the object of the background; and a motion control unit configured to control a motion of the virtual camera based on the first contact position information detected by the detection unit such that the virtual camera avoids the object of the background.

18 Claims, 9 Drawing Sheets

| VIRTUAL OBJECT No. | CONTACT POSITION INFORMATION | PRESSURE INFORMATION | DISTANCE INFORMATION |
|---|---|---|---|
| C1 | $(x_1, y_1)$ | P1 | D1 |
| C1 | $(x_2, y_2)$ | P2 | D2 |
| C2 | $(x_3, y_3)$ | P3 | D3 |
| C2 | $(x_4, y_4)$ | P4 | D4 |
| C2 | $(x_5, y_5)$ | P5 | D5 |
| C3 | $(x_6, y_6)$ | P6 | D6 |
| C4 | $(x_7, y_7)$ | P7 | D7 |
| ⋮ | ⋮ | ⋮ | ⋮ |

INFORMATION PROCESSING APPARATUS, MOTION CONTROL METHOD, AND NON-TRANSITORY COMPUTER-READABLE RECORDING MEDIUM

CROSS-REFERENCE TO RELATED APPLICATION

The present application is based on and claims the benefit of priority of Japanese Priority Application No. 2015-210832 filed on Oct. 27, 2015, the entire contents of which are hereby incorporated by reference.

BACKGROUND OF THE INVENTION

Field of the Invention

The present invention relates to an information processing apparatus, a motion control method, and a non-transitory computer-readable recording medium.

A technique for displaying a player character or a non-player character (may be referred to as "character" hereinafter) and a background in a virtual space and for causing the character to perform a predetermined motion in accordance with an operation by a player is known in the related art (see Patent Document 1, for example).

When the player performs an input operation such as rotation, translation or the like for operating the character, calculation processing is performed for obtaining how to change the position, the direction or the like of the character in accordance with the input operation. Next, another calculation processing is performed for obtaining how to display objects such as buildings or the like of the background on a screen in accordance with the change of the position, the direction or the like of the character. Positional information for each of the objects that is previously stored in a storage unit is used for the calculation processing.

The above two kinds of calculation processing are performed in real time following the operation by the player. Motions of the character corresponding to the operation of the player are captured by a virtual camera that captures the character from behind the character, and a captured result is displayed. In this way, the character can be displayed on the screen in accordance with the operation by the player.

However, when the character moves at high speed or the motion of the character rapidly changes, sometimes the virtual camera that follows the character collides with an object of the background. In this case, the virtual camera cannot follow the character. Thus, it becomes difficult to appropriately display the character.

PATENT DOCUMENT

[Patent Document 1] Japanese Laid-open Patent Publication No. 2001-276420

SUMMARY OF THE INVENTION

One aspect of at least one embodiment of the present invention is to appropriately display a character in a virtual space.

According to an embodiment, there is provided an information processing apparatus includes a virtual camera configured to capture a character in a virtual space; a display unit configured to display the character and a background, the background including an object; a detection unit configured to detect first contact position information on a first position at which a first virtual object provided between the virtual camera and the character contacts the object of the background; and a motion control unit configured to control a motion of the virtual camera based on the first contact position information detected by the detection unit such that the virtual camera avoids the object of the background.

According to another embodiment, there is provided a non-transitory computer-readable recording medium storing a program that causes a computer to execute processing. The processing includes causing a virtual camera to capture a character in a virtual space; displaying the character and a background, the background including an object; detecting first contact position information on a first position at which a first virtual object provided between the virtual camera and the character contacts the object of the background; and controlling a motion of the virtual camera based on the detected first contact position information such that the virtual camera avoids the object of the background.

BRIEF DESCRIPTION OF THE DRAWINGS

Other objects, features and advantages of the present invention will become more apparent from the following detailed description when read in conjunction with the accompanying drawings.

DETAILED DESCRIPTION OF THE PREFERRED EMBODIMENTS

In the following an embodiment of the present invention will be described with reference to the accompanying drawings. It should be noted that, in the following descriptions and drawings, same reference numbers are given to elements having substantially same functions and overlapping descriptions may be omitted as appropriate.

Figure 1:
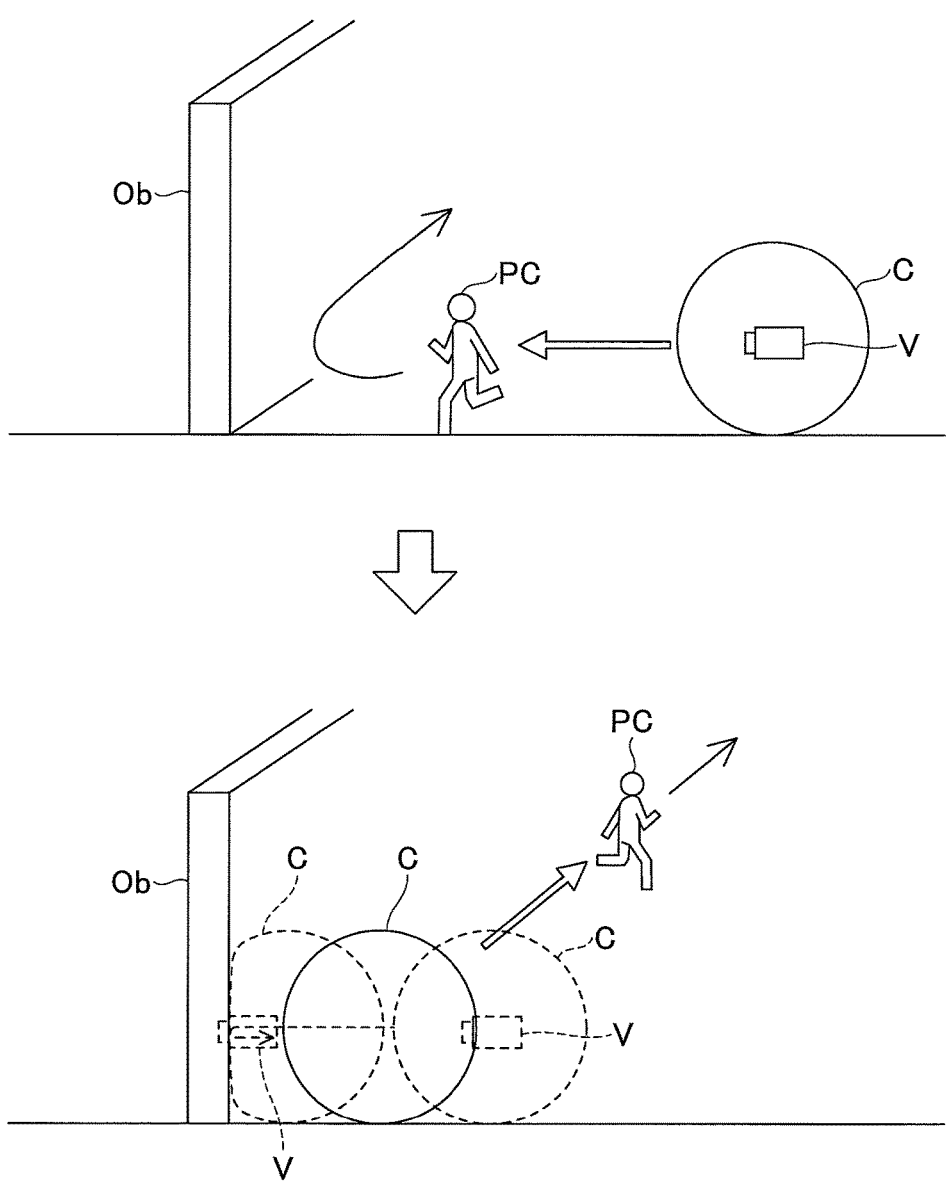
FIG. 1 is a drawing illustrating an example of a motion of a character and a motion of a virtual camera in the related art.

As illustrated in FIG. 1, motions of a player character PC in a virtual space are, for example, captured (imaged) by a virtual camera V. For example, the virtual camera V captures the player character PC from behind the player character. A captured result is displayed on a display.

The virtual camera V is contained in a virtual object C. The virtual object C is not actually displayed on a screen. Virtual objects C1 to C8, which will be described later, may be simply referred to as a virtual object C as well. For example, when the virtual object C contacts an object Ob displayed on the screen, the virtual object C serves as a cushion and protects the inside virtual camera V from an external obstacle (object). In this way, the virtual camera V can follow the player character PC to capture the motions of the player character PC, and the captured player character PC can be smoothly displayed.

However, in a case where the player character PC moves at high speed or the motion of the player character PC changes rapidly, sometimes the virtual camera V cannot follow the player character PC when following the player character PC. As a result, the virtual camera V sometimes collides with the object Ob. A lower part of FIG. 1 illustrates an example where the virtual camera V collides with the object Ob because the player character, PC turns rapidly. In this example, the virtual object C is crushed and cannot protect the virtual camera V. As a result, the virtual camera V cannot display the player character PC appropriately. Thus, an information processing apparatus 10 according to an embodiment of this invention provides motion control of the virtual camera V that can appropriately display the player character PC in the virtual space.

(Functional Structure of Information Processing Apparatus)

Figure 2:
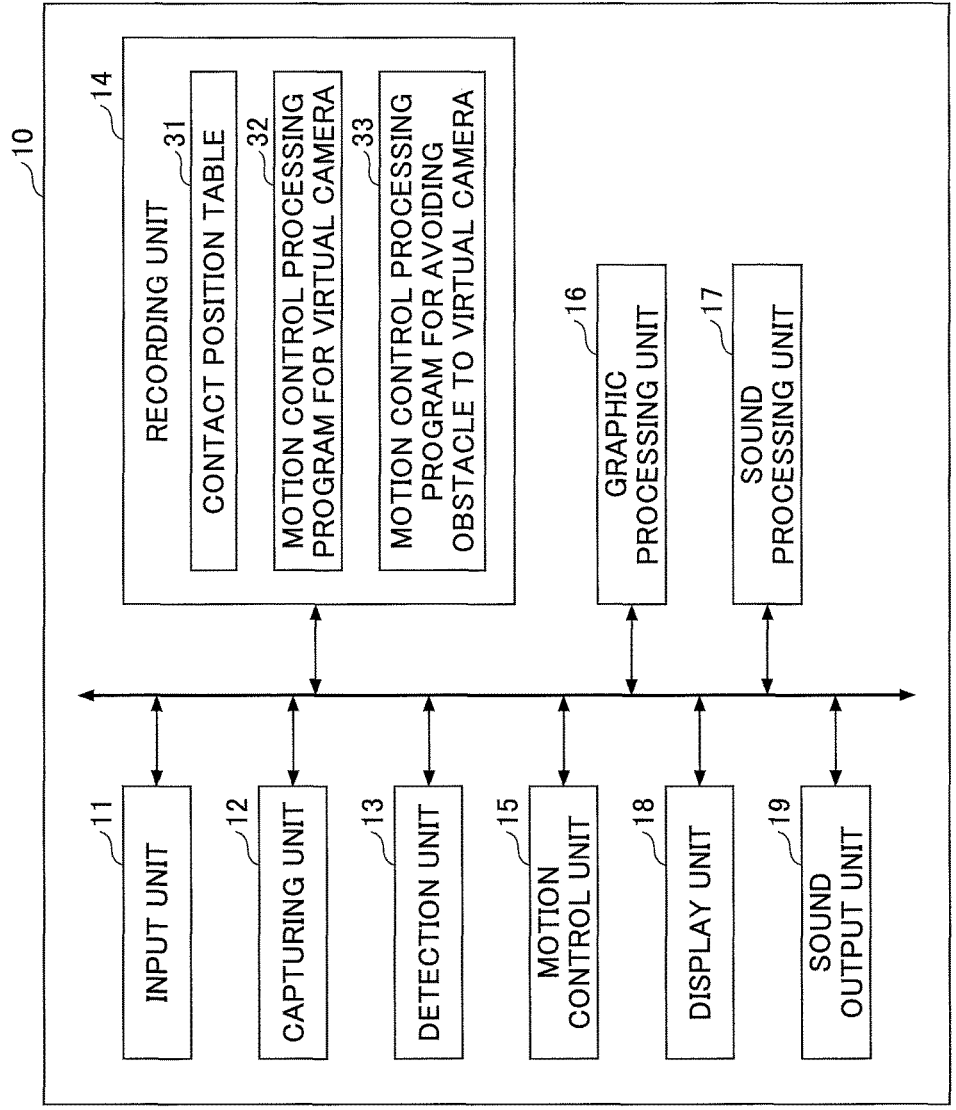
FIG. 2 is a block diagram illustrating an example of a functional structure of an information processing apparatus according to an embodiment.

First, a functional structure of the information processing apparatus 10 according to the embodiment of the present invention will be described with reference to FIG. 2. FIG. 2 is a block diagram illustrating an example of the functional structure of the information processing apparatus 10 according to the embodiment. The information processing apparatus 10 according to the embodiment executes a predetermined game when a player (user) operates the player character PC. Further, the information processing apparatus 10 controls the motion of the virtual camera V during the game. The information processing apparatus 10 may be an electronic device such as a personal computer, a tablet terminal, a game device, a smartphone or the like.

The information processing apparatus 10 includes an input unit 11, a capturing unit 12, a detection unit 13, a recording unit 14, a motion control unit 15, a graphic processing unit 16, a sound processing unit 17, a display unit 18, and a sound output unit 19.

The input unit 11 receives input information from an input device such as a controller or the like operated by the player (user). Then, the player character PC may move in accordance with the input. The capturing unit 12 has a function of the virtual camera V to capture (image) the player character PC. The detection unit 13 detects contact position information on a position at which an object such as a building or the like on a stage of a background displayed on the display unit 18 and the virtual object C provided in the virtual space are in contact with each other. The detection unit 13 may bound (bounce), rotate, or slide the virtual object C to detect the contact position information on the position at which the virtual object C contacts the object.

The contact position information includes the contact position at which the object and the virtual object C are in contact with each other. The contact position information may include a contact avoidance direction and a contact depth of the object and the virtual object C. The contact depth represents an amount of push-in (pushing) applied from the object to the virtual object C when the object and the virtual object C are in contact with each other. The contact avoidance direction represents a direction of the virtual object C for avoiding the contact with the object in accordance with a contact state of the object and the virtual object C.

Figure 3:
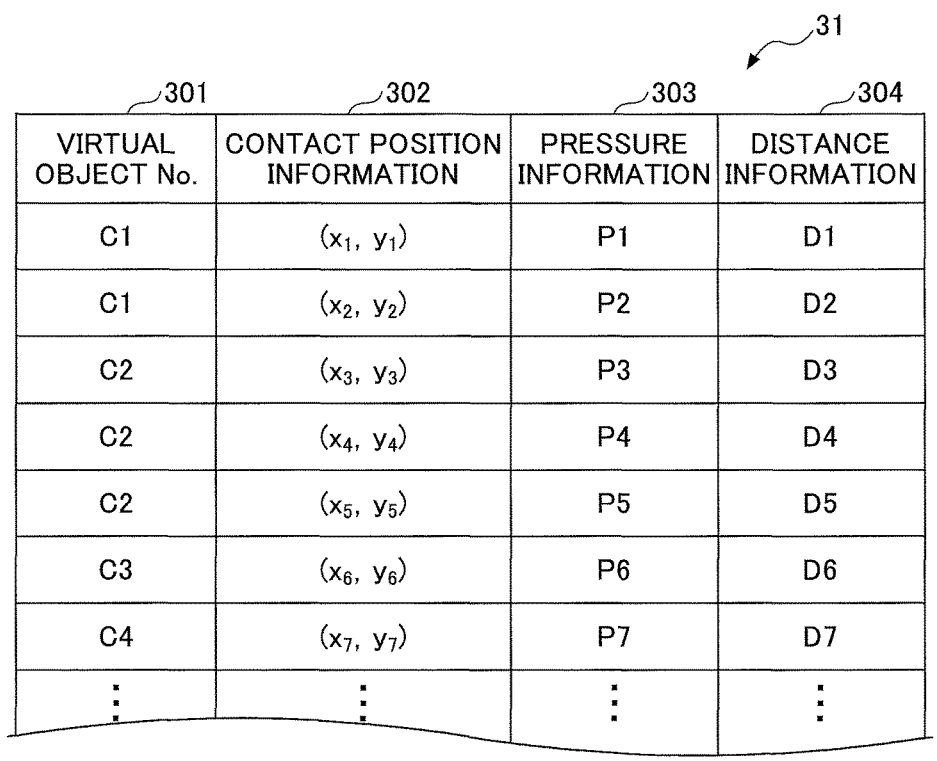
FIG. 3 is a drawing illustrating an example of a data structure of a contact position table according to the embodiment.

The recording unit 14 stores (records), in a contact position table 31 as illustrated in FIG. 3, a virtual object number 301, contact position information 302, pressure information 303, and distance information 304. As illustrated in FIG. 3, the contact position information 302 on contact positions $(x_1, y_1)$ to $(x_7, y_7)$, the pressure information 303 on pressures P1 to P7, the distance information 304 on distances D1 to D7 are associated with respective virtual object numbers C1 to C4. The detection unit 13 calculates a pressure applied to the virtual object C based on the contact position, the contact depth, and the contact avoidance direction included in the contact position information. The recording unit 14 stores (records) the calculated pressured in the pressure information 303. It is determined based on the pressure information 303 whether it is necessary to avoid an obstacle to the virtual camera V. Details of this determination will be described later.

The recording unit 14 stores, in the contact position information 302, coordinates at which the virtual object C contacts the object Ob while the virtual object C bounds, rotates, or slides to move. The recording unit 14 stores, in the distance information 304, a distance between the object Ob and the virtual object C when they are in contact with each other. Specifically, as for the virtual objects C1 and C4 to C8 that do not contain the virtual camera V illustrated in FIG. 5, the recording unit 14 stores, in the distance information 304, distances between the object Ob and the respective virtual objects C1 and C4 to C8 when they are in contact with each other. On the other hand, as for the virtual objects C2 and C3 that contain the virtual camera V illustrated in FIG. 5, the recording unit 14 stores, in the distance information 304, distances from contact surfaces between the object Ob and the respective virtual objects C2 and C3 to a point where the virtual camera V is located when they are in contact with each other.

The recording unit 14 further stores various data and various programs. The various programs include a motion control processing program 32 for the virtual camera V and a motion control processing program 33 for avoiding an obstacle to the virtual camera V. These programs are executed by the information processing apparatus 10 while the player (user) plays the predetermined game.

Referring back to FIG. 2, the motion control unit 15 controls motions of the characters in the virtual space. Although the motion control unit 15 mainly controls the motion of the player character PC in this embodiment, the motion control unit 15 may control motions of a non-player character NPC and all objects movable in the virtual space. In this embodiment, all objects that are movable such as a tree that bends before the wind or the like, for example, the non-player character NPC and the player character PC may be referred to as "character".

The motion control unit 15 controls the motion of the virtual camera V such that the virtual camera V avoids the object Ob based on the contact position information 302. Further, based on not only the contact position information 302 but also the pressure information 303, the motion control unit 15 may control the motion of the virtual camera V in consideration of the pressure applied to the virtual camera V from the object Ob when the virtual object C contacts the object Ob such that the virtual camera V avoids collision with the object Ob. Further, for example, based on not only the contact position information 302 but also the distance information 304, the motion control unit 15 may control the motion of the virtual camera V in consideration of the distance between the virtual camera V and the object Ob when the virtual object C contacts the object Ob such that the virtual camera V avoids the collision with the object Ob.

The graphic processing unit 16 is connected to the display unit 18. When the motion control unit 15 outputs an instruction to display (draw) an image, the graphic processing unit 16 outputs a video signal for displaying the image to the display unit 18. In this way, the display unit 18 displays the player character PC and the stage of the background in the virtual space. In other words, the display unit 18 displays the player character PC and the background, which includes the object Ob. 1 frame time of the image included in the video signal output from the graphic processing unit 16 is $\frac{1}{30}$ second, for example. The graphic processing unit 16 displays (draws) one image at a frame unit (that is, $\frac{1}{30}$ second unit).

The sound processing unit 17 is connected to the sound output unit 19. When the sound processing unit 17 outputs an instruction to output a sound, the sound output unit 19 outputs a sound signal to the speaker 20. In this way, the sound corresponding to a state of the player character PC is output.

(Hardware Structure of Information Processing Apparatus)

Figure 4:
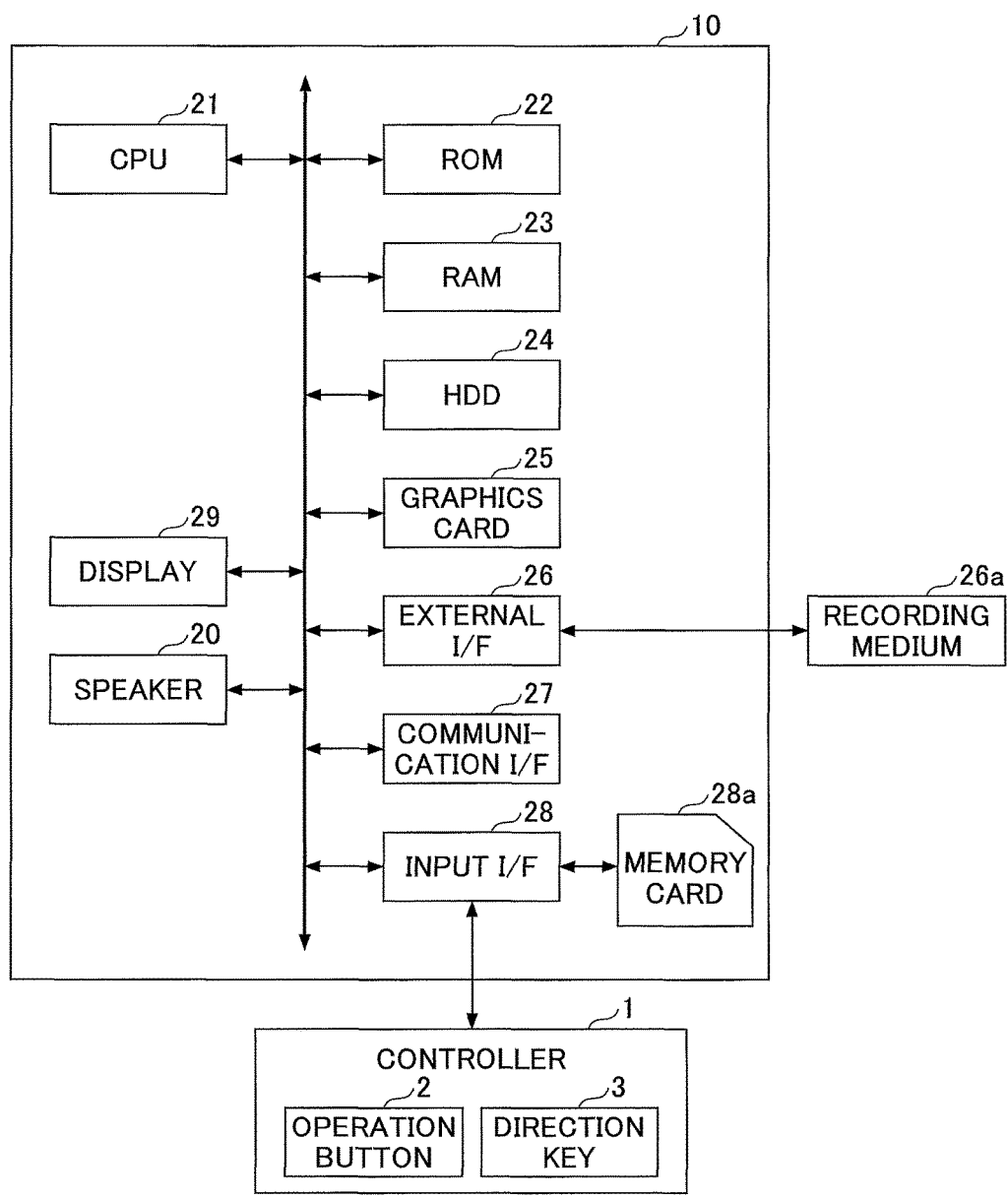
FIG. 4 is a block diagram illustrating an example of a hardware structure of the information processing apparatus according to the embodiment.

Next, a hardware structure of the information processing apparatus 10 according to the embodiment of the present invention will be described with reference to FIG. 4. FIG. 4 is a block diagram illustrating an example of the hardware structure of the information processing apparatus 10 according to the embodiment. The information processing apparatus 10 according to the embodiment includes a CPU (Central Processing Unit) 21, a ROM (Read Only Memory) 22, a RAM (Random Access Memory) 23, and a HDD (Hard Disk Drive) 24. The information processing apparatus 10 according to the embodiment further includes a graphics card 25, an external I/F (interface) 26, a communication I/F 27, an input I/F 28, a display 29, and a speaker 20. The components are connected with each other via a bus.

The ROM 22 is a nonvolatile semiconductor memory capable of storing internal data even when a power source is turned off. The ROM 22 stores programs and data. The RAM 23 is a volatile semiconductor memory that temporarily stores programs and data.

The HDD 24 is a nonvolatile storage device that stores programs and data. The programs stored in the HDD 24 include basic software that controls the entirety of the information processing apparatus 10 and application software. The HDD 24 may store various databases. In this embodiment, the HDD 24 stores various programs including the motion control processing program 32 for the virtual camera V and the motion control processing program 33 for avoiding the obstacle to the virtual camera V. Further, the HDD 24 stores the contact position table 31.

The CPU 21 actualizes the control of the entirety of the information processing apparatus 10 and the functions of the information processing apparatus 10 by reading out the programs and data from the ROM 22 or the HDD 24 on the RAM 23, and executing the various kinds of processing. Specifically, the functions of the detection unit 13 and the motion control unit 15 illustrated in FIG. 1 are actualized by processing that the motion control processing program 32 for the virtual camera V and the motion control processing program 33 for avoiding the obstacle to the virtual camera V installed in the information processing apparatus 10 cause the CPU 21 to execute.

The external I/F 26 is an interface for connecting the information processing apparatus 10 to an external device. The external device may be a recording medium 26a or the like. In this way, the information processing apparatus 10 is capable of reading out data from the recording medium 26a and writing data on the recording medium 26a via the external I/F 26. As an example of the recording medium 26a, a CD (Compact Disk), a DVD (Digital Versatile Disk), an SD memory card, a USB memory (Universal Serial Bus memory) or the like may be used.

For example, the recording medium 26a that stores a game program such as the motion control processing program 32 for the virtual camera V and the motion control processing program 33 for avoiding the obstacle to the virtual camera V can be attached to the information processing apparatus 10. These programs are read out via the external I/F 26 and read by the RAM 23.

The CPU 21 processes the various programs loaded on the RAM 23, and instructs the graphics card 25 to output images corresponding to the progress of the game. The graphics card 25 performs image processing corresponding to a game scene displayed on the screen in accordance with the instruction, and causes the display 29 to display (draw) an image of the player character PC and an image of the stage. In this way, the functions of the graphic processing unit 16 and the display unit 18 are actualized.

1 frame time of the image output from the graphics card 25 is $\frac{1}{30}$ to $\frac{1}{60}$ second, for example. The graphics card 25 displays (draws) one image at a frame unit. This means that 30 to 60 frame images are displayed every second.

The CPU 21 executes the various programs loaded on the RAM 23, and causes the speaker 20 to output a predetermined sound corresponding to the progress of the game. In this way, the functions of the sound processing unit 17 and the sound output unit 19 are actualized.

The display 29 may be a touch panel. When the display 29 is a touch panel, the input operation can be performed without using the controller 1. In such a case, input information on touched positions detected by the touch panel are stored in the RAM 23. Then, the CPU 21 executes various kinds of calculation processing based on the input information stored in the RAM 23.

The communication I/F 27 is an interface for connecting the information processing apparatus 10 to a network. The communication I/F 27 may have a function to perform wireless communication with another game device via a communication unit including an antenna.

The input I/F 28 is an interface for connecting to the controller 1. The controller 1 includes an operation button 2 and a direction key 3. The player (user) can cause the player character PC to perform a predetermined motion by operating the operation button 2. Further, the player can move the player character PC in a predetermined direction by operating the direction key 3. The input I/F 28 stores input information based on the input operation performed by the player using the controller 1 in the RAM 23. In this way, the function of the input unit 11 is actualized.

The CPU 21 executes various kinds of calculation processing such as the control of the motion of the player character PC or the like based on the input information stored in the RAM 23. The input I/F 28 stores data representing the progress status of the game stored in the RAM 23 in the memory card 28a in accordance with an instruction from the CPU 21, and reads out the data of the game that is temporarily interrupted stored in the memory card 28a to transfer it to the RAM 23. The function of the virtual camera V that captures the character displayed in the virtual space is actualized by the CPU 21 executing the motion control processing program 32 for the virtual camera and the motion control processing program 33 for avoiding the obstacle to the virtual camera.

(Virtual Object)

Figure 5:
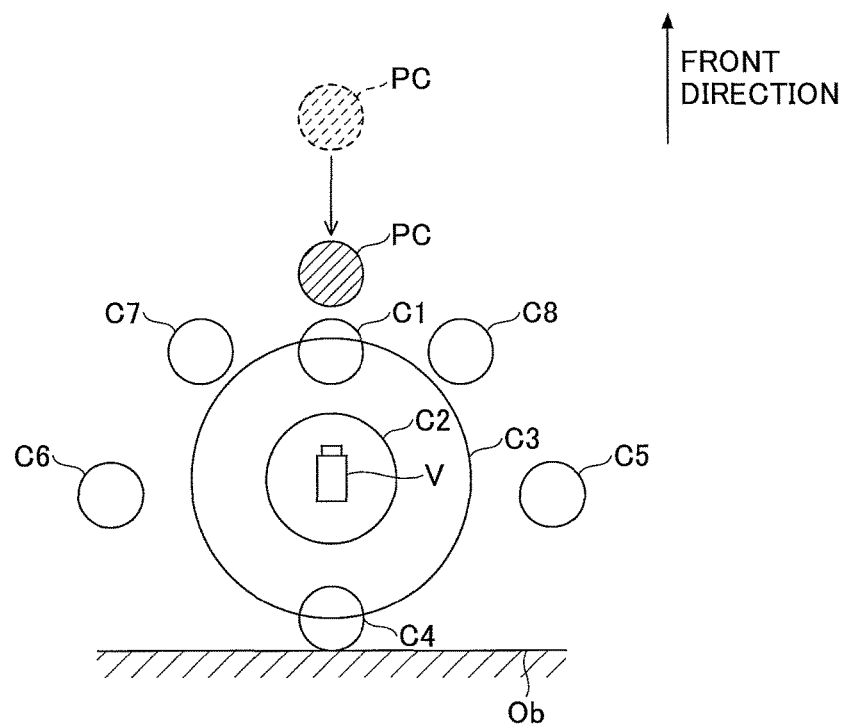
FIG. 5 is a diagram illustrating an example of a motion for avoiding an obstacle to a virtual camera according to the embodiment.

FIG. 5 illustrates an example of arrangement of the virtual objects. As illustrated in FIG. 5, the detection unit 13 may arrange a virtual object C1 between the virtual camera V and the player character PC. The number of virtual objects C may be one. A plurality of virtual objects C may be provided in accordance with a position of the player character PC. For example, a virtual object C3 may be provided at a position containing a virtual object C2. The virtual object C2 contains the virtual camera V. In this case, the detection unit 13 detects a contact position at which the virtual object C3 containing the virtual camera V and the virtual object C2 contacts the object Ob. One or more virtual objects C may be provided in a front direction, in a rear direction, and/or in a side direction of the virtual camera V as illustrated by virtual objects C4 to C8 in FIG. 5. In other words, one or more virtual objects C may be provided around the virtual camera V.

The vibration (the number of boundings) of the virtual object C may be once a frame, that is, about 30 to 60 times per second, or other numbers. The virtual object C is controlled to perform a predetermined motion when the virtual object C is used to measure the contact positions of the object. The predetermined motion includes causing the virtual object C to bound, causing the virtual object C to slide, causing the virtual object C to vibrate, causing the virtual object C to rotate or the like.

Here, the virtual object C1 is an example of a first virtual object provided between the virtual camera V and the character. The virtual object C2 is an example of a second virtual object containing the virtual camera V. The virtual object C3 is an example of a third virtual object containing the virtual camera V and the second virtual object. The virtual objects C4 to C8 are examples of a fourth virtual object provided around the virtual camera V.

(Motion Control Processing for Virtual Camera)

Figure 6:
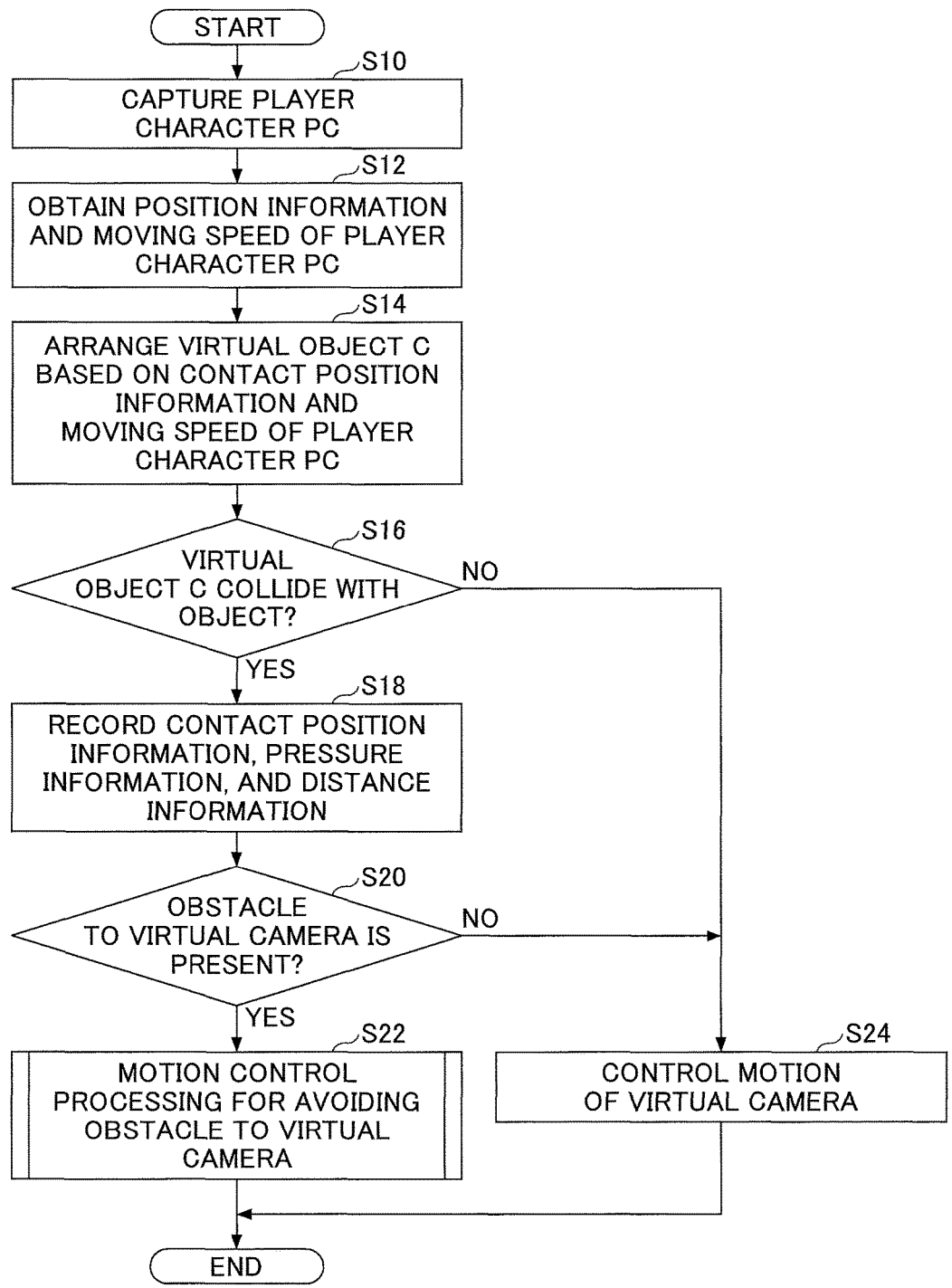
FIG. 6 is a flowchart illustrating an example of motion control processing for the virtual camera according to the embodiment.
Figure 7:
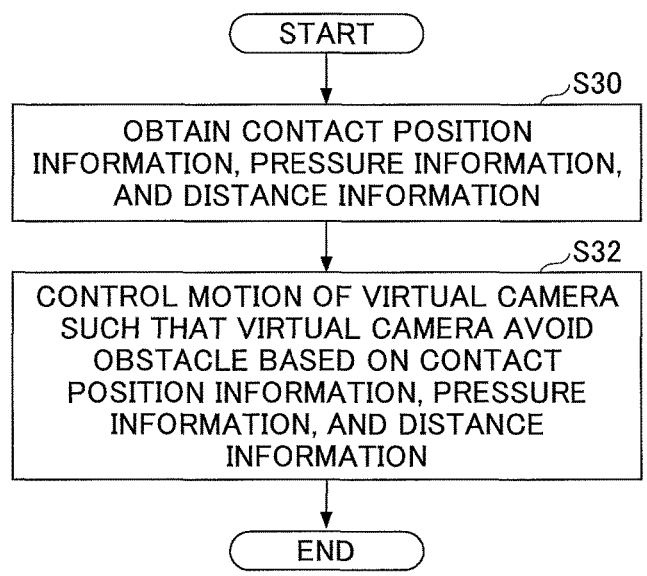
FIG. 7 is a flowchart illustrating an example of motion control processing for avoiding the obstacle to the virtual camera according to the embodiment.

Next, motion control processing for the virtual camera according to the embodiment is described with reference to FIGS. 6 and 7. FIG. 6 is a flowchart illustrating an example of the motion control processing for the virtual camera according to the embodiment. FIG. 7 is a flowchart illustrating an example of the motion control processing for avoiding the obstacle to the virtual camera according to the embodiment. In the motion control processing for the virtual camera according to the embodiment, the motions of the player character PC are captured during the progress of the game.

When the processing illustrated in FIG. 6 is started, the capturing unit 12 captures the player character PC in step S10. Next, the detection unit 13 obtains in step S12 position information and moving speed of the player character PC at the moment. Next, the detection unit 13 arranges (provides) in step S14 the virtual object C based on the position information and the moving speed obtained in step S12.

As illustrated in FIG. 5, the detection unit 13 may arrange the virtual object C1 between the virtual camera V and the player character PC. The detection unit 13 may arrange the virtual object C3 at a position containing the virtual object C2. The detection unit 13 may arrange one or more virtual objects C4 to C8 in a front direction, in a rear direction, or in a side direction of the virtual camera V.

Figure 8:
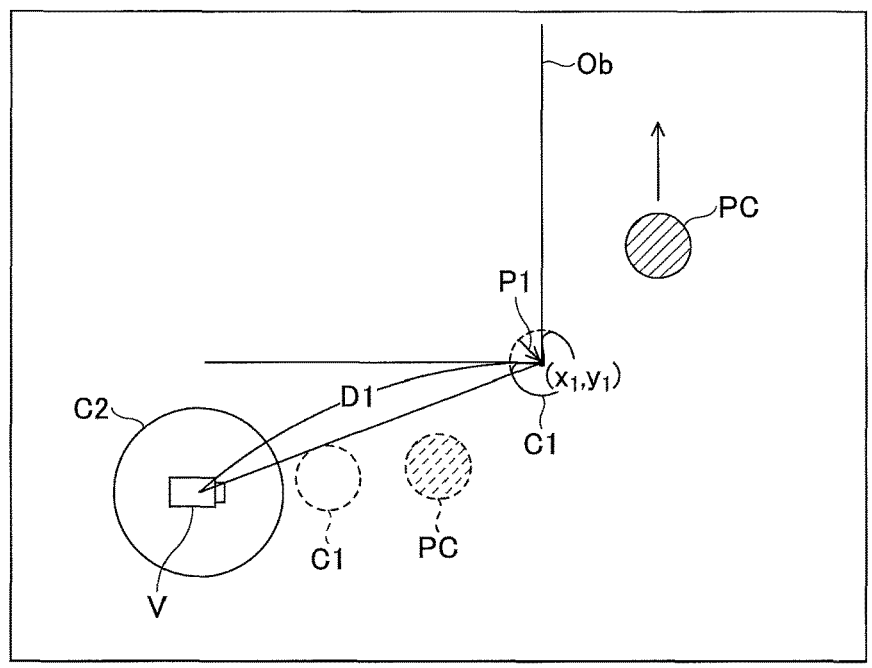
FIG. 8 is a drawing illustrating an example of a motion for avoiding an obstacle to the virtual camera according to the embodiment.
Figure 8:
Figure 8:
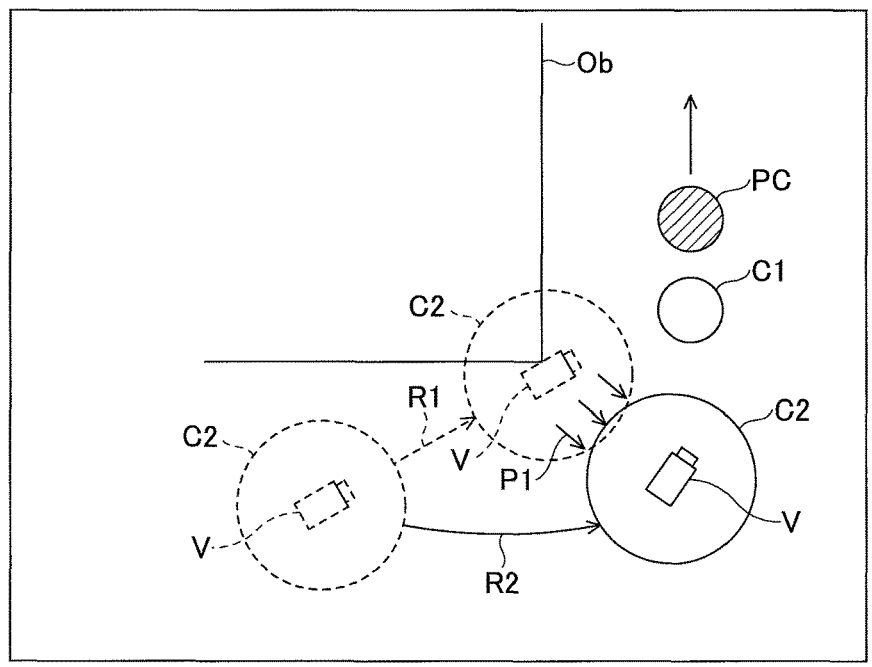

In this case, as illustrated in FIG. 8, the detection unit 13 arranges the virtual object C1 between the player character PC and the virtual object C and does not arrange other virtual objects. Here, the virtual object C has a sphere shape. However, the detection unit 13 may change a size and a shape of the virtual object C as appropriate. For example, the virtual object may have a shape such as a sphere shape, a capsule shape, a stick shape, a rectangular shape, a conical shape, a polygonal shape, an ellipse shape, a circular shape or the like. When the game provided by the information processing apparatus 10 according to the embodiment is a game in a three dimensional virtual space, the virtual object C is a three dimensional virtual object corresponding to the game. When the game provided by the information processing apparatus 10 according to the embodiment is a game in a two dimensional virtual space, the virtual object C is a two dimensional virtual object corresponding to the game.

The detection unit 13 can control the virtual object C to change the size of the virtual object C depending on setting of the displayed background (stage). For example, in a case where the stage is large, the detection unit 13 may enlarge the virtual object C. In a case where the stage is small, the detection unit 13 may lessen the virtual object C.

Further, the detection unit 13 may change the size of the virtual object C depending on an action of the character. In other words, the detection unit 13 may control (change) the sizes of the virtual objects C1 to C8, depending on the displayed background and/or the action of the character, to detect the contact position information at which the virtual objects C1 to C8 contact the object Ob. For example, the detection unit 13 may enlarge the virtual object C as the moving speed of the character increases. The detection unit 13 may lessen the virtual object C as the moving speed decreases. For example, the detection unit 13 may provide the virtual object C having a first size when the character moves at a first speed, and the detection unit 13 may provide the virtual object C having a second size larger than the first size when the character moves at a second speed higher than the second speed.

Referring back to FIG. 6, the detection unit 13 determines whether the virtual object C arranged at the predetermined position collides with the object Ob in step S16. In a case where the detection unit 13 determines that the virtual object C does not collide with the object Ob (NO in step S16), the detection unit 13 performs control to cause the virtual camera V to follow the player character PC as usual in step S24. Then, the processing is finished.

On the other hand, in a case where the detection unit 13 determines that the virtual object C collides with the object Ob (YES in step S16), the recording unit 14 records (stores) coordinates of the collision position in the contact position table 31 of the contact position information 302 in step S18. The recording unit 14 may record a pressure in the pressure information 303 and record a distance in the distance information 304 as well as recording the coordinates in the contact position information 302.

For example, in the example of FIG. 8, the coordinates $(x_1, y_1)$ of when the virtual object C1 contacts (collides with) an edge portion of the object Ob is stored in the contact position information 302 corresponding to the virtual object number 301 "C1". Further, the pressure P1 applied to the virtual object C1 from the object Ob of when the virtual object C1 contacts the object Ob is stored in the pressure information 303. Further, the distance D1 between the object Ob and the virtual camera V of when the virtual object C1 contacts the object Ob is stored in the distance information 304.

The virtual object C1 is located between the player character PC and the virtual camera V. Thus, it can be predicted by the contact position information 302 on the virtual object C1 located between the object Ob and the virtual camera V whether the virtual camera V, which follows the player character PC in a traveling direction of the player character PC, collides with the object Ob.

Thus, in step S20 of FIG. 6, the detection unit 13 determines whether an obstacle to the virtual camera V is present. The detection unit 13 detects the obstacle to the virtual camera V based on the contact position information 302 corresponding to the virtual object number 301 "C1" of the contact position table 31. For example, the coordinates $(x_1, y_1)$ illustrated in FIG. 8 are stored in the contact position information 302 corresponding to the virtual object number 301 "C1" in FIG. 3. Thus, the detection unit 13 detects the object Ob as the obstacle when the virtual camera V follows the player character PC, and detects the coordinates $(x_1, y_1)$ as a position of the obstacle. As a result, the detection unit 13 determines that the obstacle to the virtual camera V is present (YES in step S20) and executes in step S22 the motion control processing for avoiding the obstacle to the virtual camera V of FIG. 7. Then, the processing is finished.

In a case where the detection unit 13 determines that the obstacle to the virtual camera V is not present (No in step S20), the detection unit 13 in step S24 performs the control to cause the virtual camera V to follow the player character PC as usual in step S24. Then, the processing is finished.

Here, the detection unit 13 may perform the collision determination of step S16 once for 1 frame, or may perform the collision determination of step S16 for a plurality of times for 1 frame.

(Motion Control Processing for Avoiding Obstacle to Virtual Camera)

Next, motion control processing for avoiding the obstacle to the virtual camera of step S22 will be described with reference to FIG. 7. The motion control unit 15 obtains, from the contact position table 31, the contact position information 302, the pressure information 303, and the distance information 304 whose virtual object number 301 is "C1" in step S30. Next, the motion control unit 15 controls in step S32 the motion of the virtual camera for avoiding the obstacle based on the contact position information 302, the pressure information 303, and the distance information 304 obtained in step S30. Then the processing is finished.

For example, the motion control unit 15 controls the motion of the virtual camera V such that the virtual camera V does not contact or collide with the object Ob at the contact position specified based on the contact position information 302. At this time, the motion control unit 15 may control the motion of the virtual camera V based on the pressure information 303 such that a trajectory of the virtual camera V separates from the contact position as the pressure increases. Further, the motion control unit 15 may control the motion of the virtual camera V based on the distance information 304 such that the trajectory of the virtual camera V separates from the contact position as the distance decreases. Here, the motion control unit 15 may control the motion of the virtual camera V when the player character PC changes a traveling direction at a speed higher than a predetermined speed.

However, in steps S30 and S32, the motion control unit 15 may control the motion of the virtual camera V in consideration of the contact position information 302 and the distance information 304 without taking into consideration the pressure information 303. The motion control unit 15 may control the motion of the virtual camera V in consideration of the contact position information 302 and the pressure information 303 without taking into consideration the distance information 304. The motion control unit 15 may control the motion of the virtual camera V in consideration of only the contact position information 302. In other words, for example, in a case where the detection unit 13 detects the first contact position information on the first position at which the virtual object C1 contacts the object Ob, the motion control unit 15 may control the motion of the virtual camera V, based on the first contact position information and at least one of pressure information representing a pressure applied to the virtual object C1 from the contacted object Ob and distance information representing a distance from the contacted object Ob to the virtual object C1, such that the virtual camera V is located a predetermined distance or longer away from the contacted object Ob. Also, in a case where the detection unit 13 detects the second contact position information on the second position at which the virtual object C3 contacts the object Ob, the motion control unit 15 may control the motion of the virtual camera V, based on the second contact position information and at least one of pressure information representing a pressure applied to the virtual object C3 from the contacted object Ob and distance information representing a distance from the contacted object Ob to the virtual object C3, such that the virtual camera V is located a predetermined distance or longer away from the contacted object Ob.

For example, based on the contact position information $(x_1, y_1)$, the pressure information P1, and the distance information D1 when the virtual object C1 contacts the objects Ob as illustrated in an upper part of FIG. 8, the motion control unit 15 shifts (changes) a movement route R of the virtual camera V in a direction where the pressure is applied to the virtual camera V as illustrated in a lower part of FIG. 8. As a result, the virtual camera V can follow the player character PC through the route R2 that does not collide with the object Ob. As described above, according to the motion control method of the embodiment, it becomes possible to predict (foresee) whether the virtual camera V collides with the object Ob present in a traveling direction. Thereby, it becomes possible to actualize the smooth camera motion. As a result, it becomes possible to appropriately display the motion of the player character in the virtual space. In other words, in a case where the virtual object C1 contacts the object Ob when the player character PC changes a traveling direction, the motion of the virtual camera V may be controlled such that the virtual camera V passes a first route so as not to contact the object Ob. Also, in a case where the virtual object C1 does not contact the object Ob when the player character PC changes the traveling direction, the motion of the virtual camera V may be controlled such that the virtual camera V passes a second route, which is different from the first route.

VARIATION EXAMPLE

As described above, in the motion control for the virtual camera V and the motion control for avoiding the obstacle to the virtual camera V according to the embodiment, the virtual object C1 provided between the virtual camera V and the player character PC is used to detect the position (first contact position) at which the virtual object C1 contacts the object Ob of the background. Then, the motion of the virtual camera V is controlled in order to avoid the object Ob based on the detected contact position information (first contact position information).

Figure 9:
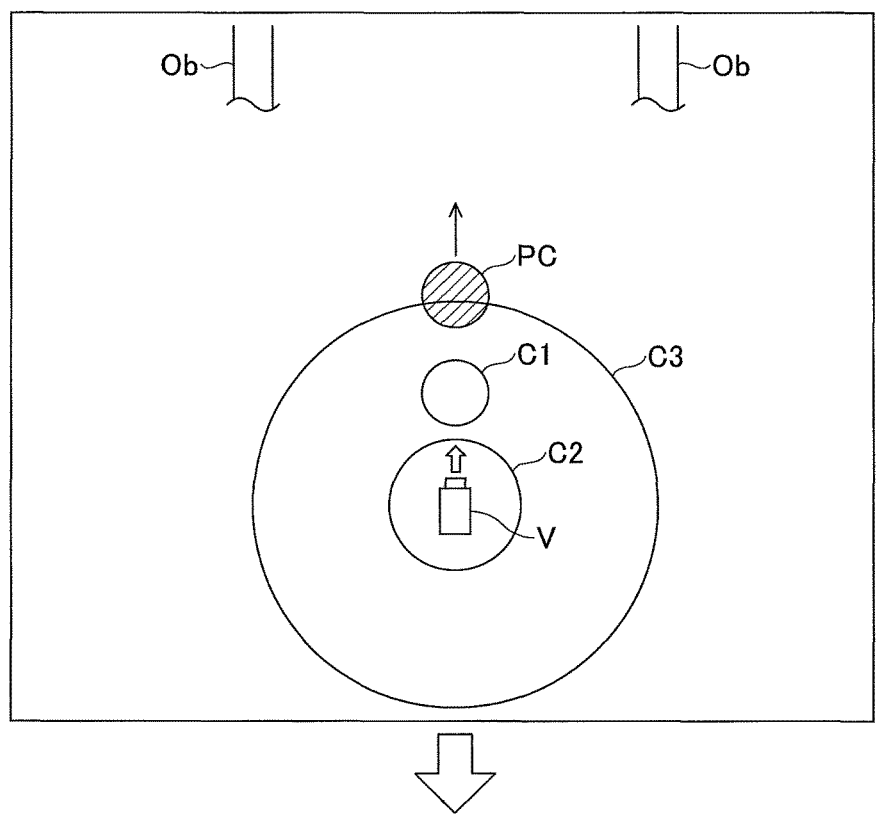
FIG. 9 is a drawing illustrating an example of a motion for avoiding obstacles to the virtual camera according to the embodiment.
Figure 9:
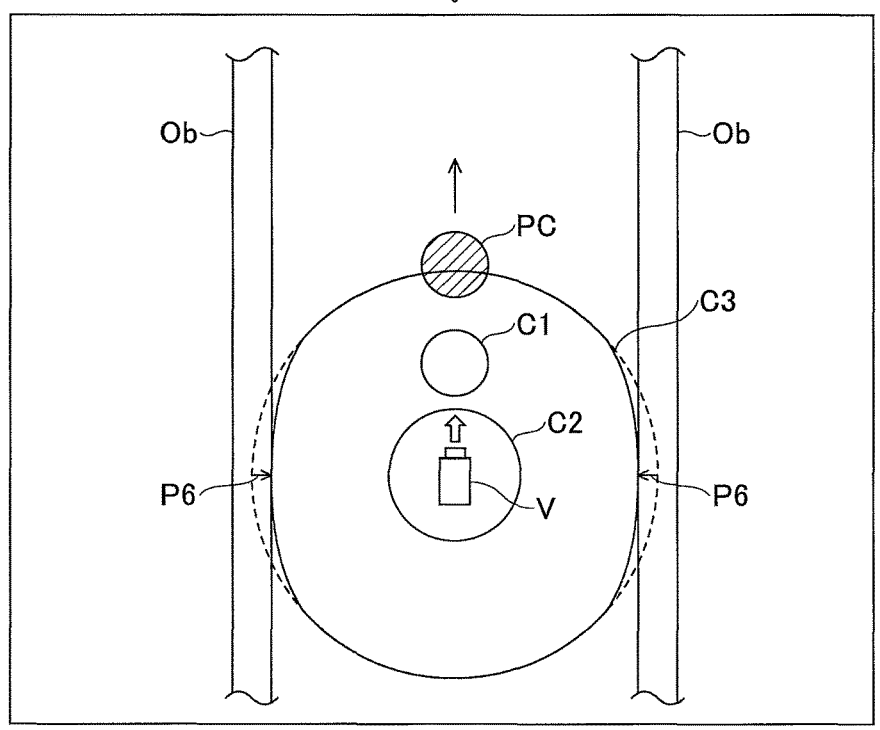

On the other hand, in the motion control for the virtual camera V and the motion control for avoiding the obstacle to the virtual camera V according to a variation example, the virtual object C3 containing the virtual camera V and the virtual object C2 is used to detect portions at which the virtual object C3 contacts with the object Ob as illustrated in FIG. 9. In other words, the second contact position information on the second position(s) at which the virtual object C3 contacts the object(s) Ob of the background is detected. Also, the virtual object C1 may be used to detect a position at which the virtual object C1 contacts the object Ob. Then, the motion of the virtual camera V is controlled in order to avoid the object Ob based on the detected contact position information and the like. Here, a case will be described where the virtual object C3 is used to obtain contact position information and motion control for avoiding obstacles to the virtual camera V is performed.

When the player character PC proceeds upwardly as illustrated in an upper part of FIG. 9, the virtual camera V follows this. In other words, the virtual camera V moves upwardly to follow the player character PC. As illustrated in a lower part of FIG. 9, objects Ob are located on both sides of the front direction of the player character PC and a narrow route is formed.

When the player character PC proceeds in the narrow route in the lower part of FIG. 9, the virtual camera V follows this. At this time, the virtual object C2 located inside the virtual object C3 does not contact the objects Ob. On the other hand, the virtual object C3 located outside the virtual camera V and the virtual object C2 contacts the objects Ob. In this way, the detection unit 13 detects contact positions and pressures applied from the objects Ob. Based on the detected result, the motion control unit 15 predicts a width of the route covered with the walls of the objects Ob to control the virtual camera V such that the virtual camera V proceeds straight. In this way, the obstacles in the traveling direction of the virtual camera V are predicted to avoid the collision of the virtual camera V with the obstacles. Thereby, it becomes possible to actualize the smooth camera motion. As a result, it becomes possible to appropriately display the player character PC in the virtual space.

According to the motion control method for the virtual camera V of the embodiment and the variation example, one or more virtual objects C are present (provided) in order to predict one or more obstacles on the route when the virtual camera V follows the player character PC. For example, one or more objects Ob, present in the traveling direction of the player character PC, in front of the virtual camera V can be predicted by arranging the virtual object C1 between the virtual camera V and the player character PC. Further, one or more objects Ob in a relatively wide range around the virtual camera V can be predicted by arranging, around the virtual camera V, the large virtual object C3 different from the virtual object C2 enclosing the virtual camera V. In this way, the smooth camera motion can be actualized by changing a route, in which the virtual camera V moves, before the virtual camera V collides with the object(s) Ob in front of or around the virtual camera V. Thereby, it becomes possible to appropriately display the character in the virtual space.

Here, as illustrated in FIG. 5, the virtual object C4 may be arranged in the rear of the virtual camera V in addition to arranging the large virtual object C3 or instead of arranging the virtual object C3. In this way, it becomes possible to predict the object Ob in the rear using the virtual object C4 before the virtual camera V collides with the object Ob in the rear. In this way, it becomes possible to avoid the contact with the object Ob in the rear in a case where the virtual camera V moves back when the play character PC backs away.

The virtual objects C5 and C6 may be arranged on both sides of the virtual camera V in addition to arranging the virtual object C4 or instead of arranging the virtual object C4. Further, the virtual objects C7 and C8 may be arranged in the front direction of the virtual camera V. In this way, it becomes possible to foresee a state in front of the virtual camera V, a state on both sides of the virtual camera V, and a state in the rear of the virtual camera V using the virtual objects C4 to C8 as well as foreseeing a state between the player character PC and the virtual camera V using the virtual object C1. In this way, it becomes possible to change the motion of the virtual camera V accurately before the virtual camera V collides with one or more objects Ob in the surrounding area.

Here, the motion control program such as the motion control processing program 32 for the virtual camera V and the motion control processing program 33 for avoiding the obstacle to the virtual camera V, which cause a computer such as the information processing apparatus 10 to execute the above described processing as illustrated in FIGS. 6 and 7, may be stored in a non-transitory computer-readable recording medium such as a game disc.

Although the embodiment of the information processing apparatus, the motion control method, and the motion control program has been specifically described, the information processing apparatus, the motion control method, and the motion control program according to the present invention are not limited to the above described embodiment and various variations and modifications may be made without departing from the spirit and scope of the present invention. Further, the embodiment and the variation example may be combined as long as a contradiction does not occur.

What is claimed is:

1. An information processing apparatus comprising:
   a virtual camera configured to follow a character to capture the character behind the character with respect to a traveling direction of the character in a virtual space;
   a display configured to display the character and a background, the background including an object;
   a memory; and
   a processor that is coupled to the memory and that is configured to
   detect first contact position information on a first position at which a first virtual object contacts the object of the background, the first virtual object being located between the virtual camera and the character and being configured to follow the character;
   detect a distance between the object of the background and the virtual camera when the first virtual object contacts the object of the background;
   predict whether the virtual camera is going to contact the object of the background based on the first contact position information and the distance detected when the first virtual object contacts the object of the background in response to a change of the traveling direction of the character from a first traveling direction to a second traveling direction intersecting with the first traveling direction; and
   upon predicting that the virtual camera is going to contact the object of the background, control a motion of the virtual camera based on the first contact position information and the distance such that the virtual camera avoids the object of the background.

2. The information processing apparatus according to claim 1, wherein the processor detects second contact position information on a second position at which a third virtual object containing a second virtual object containing the virtual camera contacts the object of the background.

3. The information processing apparatus according to claim 2,
wherein the processor detects polygon information representing a number N of polygons desired to be checked with respect to the first virtual object or to the third virtual object, and
wherein the processor controls the motion of the virtual camera based on the first contact position information and the polygon information or based on the second contact information and the polygon information such that the virtual camera is located a predetermined distance or longer away from the contacted object.

4. The information processing apparatus according to claim 2,
wherein the processor detects distance information representing a distance from the contacted object to the first virtual object or to the third virtual object, and
wherein the processor controls the motion of the virtual camera based on the first contact position information and the distance information or based on the second contact information and the distance information such that the virtual camera is located a predetermined distance or longer away from the contacted object.

5. The information processing apparatus according to claim 2, wherein the processor detects third contact position information on a third position at which a fourth virtual object provided around the virtual camera contacts the object of the background.

6. The information processing apparatus according to claim 5, wherein the processor controls sizes of the first virtual object, the third virtual object, and the fourth virtual object depending on the displayed background to detect the first contact position information, the second contact position information, and the third contact position information.

7. The information processing apparatus according to claim 5, wherein the processor controls sizes of the first virtual object, the third virtual object, and the fourth virtual object depending on an action of the character to detect the first contact position information, the second contact position information, and the third contact position information.

8. A motion control method executed by a computer, the motion control method comprising:
causing a virtual camera to follow a character to capture the character behind the character with respect to a traveling direction of the character in a virtual space;
displaying the character and a background, the background including an object;
detecting first contact position information on a first position at which a first virtual object contacts the object of the background, the first virtual object being located between the virtual camera and the character and being configured to follow the character;
detecting a distance between the object of the background and the virtual camera when the first virtual object contacts the object of the background;
predicting whether the virtual camera is going to contact the object of the background based on the first contact position information and the distance detected when the first virtual object contacts the object of the background in response to a change of the traveling direction of the character from a first traveling direction to a second traveling direction intersecting with the first traveling direction; and
upon predicting that the virtual camera is going to contact the object of the background, controlling a motion of the virtual camera based on the detected first contact position information and the distance such that the virtual camera avoids the object of the background.

9. A non-transitory computer-readable recording medium storing a program that causes a computer to execute processing, the processing comprising:
causing a virtual camera to follow a character to capture the character behind the character with respect to a traveling direction of the character in a virtual space;
displaying the character and a background, the background including an object;
detecting first contact position information on a first position at which a first virtual object contacts the object of the background, the first virtual object being located between the virtual camera and the character and being configured to follow the character;
detecting a distance between the object of the background and the virtual camera when the first virtual object contacts the object of the background;
predicting whether the virtual camera is going to contact the object of the background based on the first contact position information and the distance detected when the first virtual object contacts the object of the background in response to a change of the traveling direction of the character from a first traveling direction to a second traveling direction intersecting with the first traveling direction; and
upon predicting that the virtual camera is going to contact the object of the background, controlling a motion of the virtual camera based on the detected first contact position information and the distance such that the virtual camera avoids the object of the background.

10. The non-transitory computer-readable recording medium according to claim 9, wherein the processing further comprises:
detecting second contact position information on a second position at which a third virtual object containing a second virtual object containing the virtual camera contacts the object of the background.

11. The non-transitory computer-readable recording medium according to claim 10, wherein the processing further comprises:
detecting polygon information representing a number N of polygons desired to be checked with respect to the first virtual object or to the third virtual object,
wherein the motion of the virtual camera is controlled based on the first contact position information and the polygon information or based on the second contact information and the polygon information such that the virtual camera is located a predetermined distance or longer away from the contacted object.

12. The non-transitory computer-readable recording medium according to claim 10, wherein the processing further comprises:
detecting distance information representing a distance from the contacted object to the first virtual object or to the third virtual object, and
wherein the motion of the virtual camera is controlled based on the first contact position information and the distance information or based on the second contact information and the distance information such that the virtual camera is located a predetermined distance or longer away from the contacted object.

13. The non-transitory computer-readable recording medium according to claim 10, wherein the processing further comprises:
   detecting third contact position information on a third position at which a fourth virtual object provided around the virtual camera contacts the object of the background.

14. The non-transitory computer-readable recording medium according to claim 13, wherein the processing further comprises:
   controlling sizes of the first virtual object, the third virtual object, and the fourth virtual object depending on the displayed background to detect the first contact position information, the second contact position information, and the third contact position information.

15. The non-transitory computer-readable recording medium according to claim 13, wherein the processing further comprises:
   controlling sizes of the first virtual object, the third virtual object, and the fourth virtual object depending on an action of the character to detect the first contact position information, the second contact position information, and the third contact position information.

16. The non-transitory computer-readable recording medium according to claim 9, wherein the processing further comprises:
   receiving an input from an input device operated by a player; and
   moving the character in accordance with the input.

17. The non-transitory computer-readable recording medium according to claim 9, wherein the motion of the virtual camera is controlled such that the virtual camera avoids the object when the character changes a traveling direction at a speed higher than a predetermined speed.

18. The non-transitory computer-readable recording medium according to claim 9,
   wherein, in a case where the first virtual object contacts the object when the character changes a traveling direction, the motion of the virtual camera is controlled such that the virtual camera passes a first route, and
   wherein, in a case where the first virtual object does not contact the object when the character changes the traveling direction, the motion of the virtual camera is controlled such that the virtual camera passes a second route that is different from the first route.

* * * * *